C. A. WILLARD.
SUPPLEMENTAL CONTROL FOR MOTIVE POWER.
APPLICATION FILED DEC. 19, 1912.
1,078,232.
Patented Nov. 11, 1913.
2 SHEETS—SHEET 1.
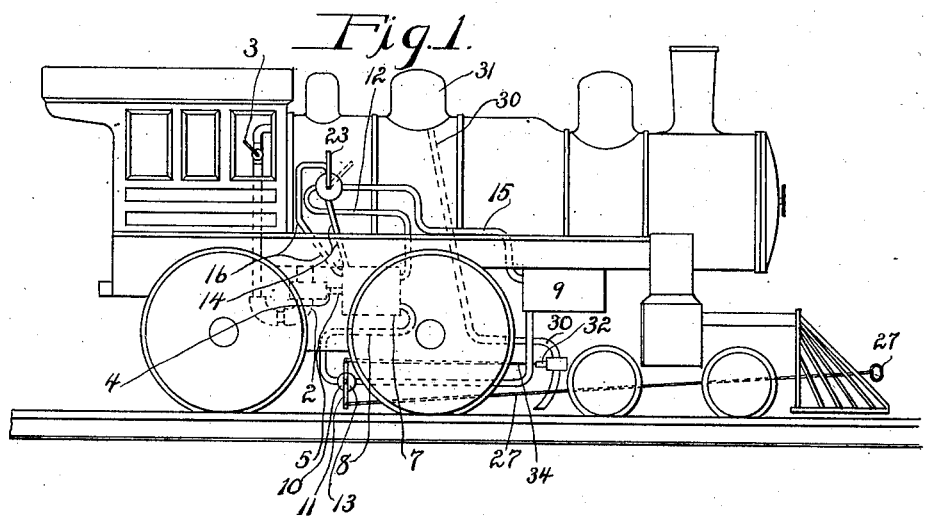
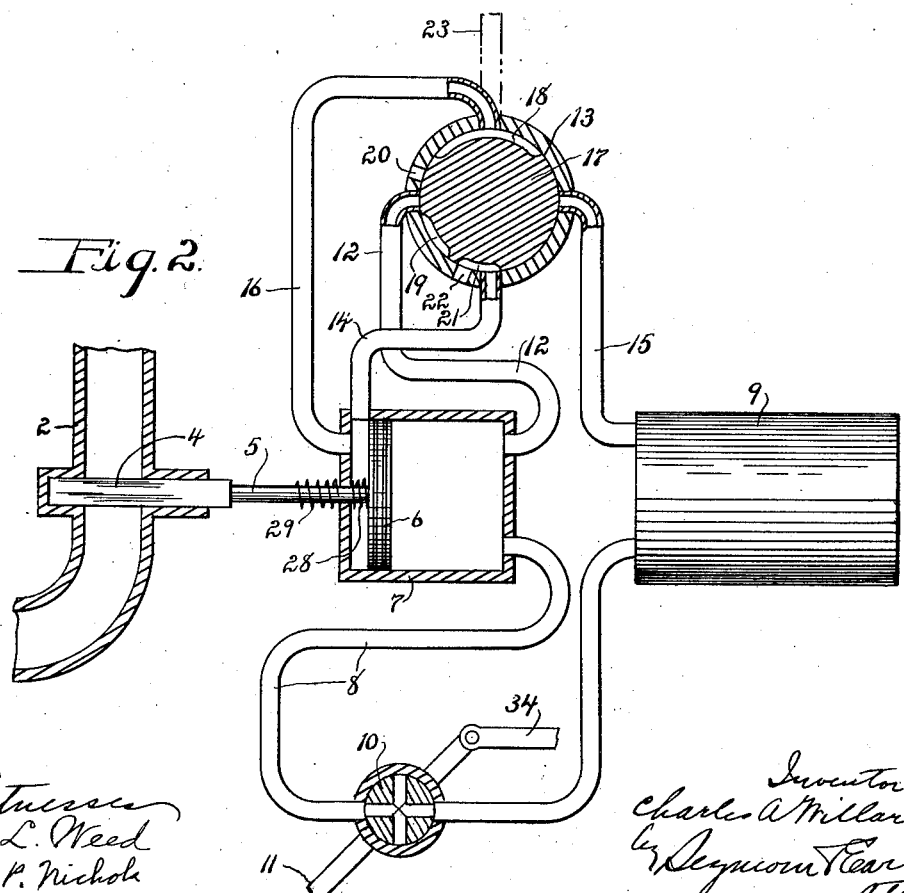

C. A. WILLARD.
SUPPLEMENTAL CONTROL FOR MOTIVE POWER.
APPLICATION FILED DEC. 19, 1912.
1,078,232.
Patented Nov. 11, 1913.
2 SHEETS—SHEET 2.
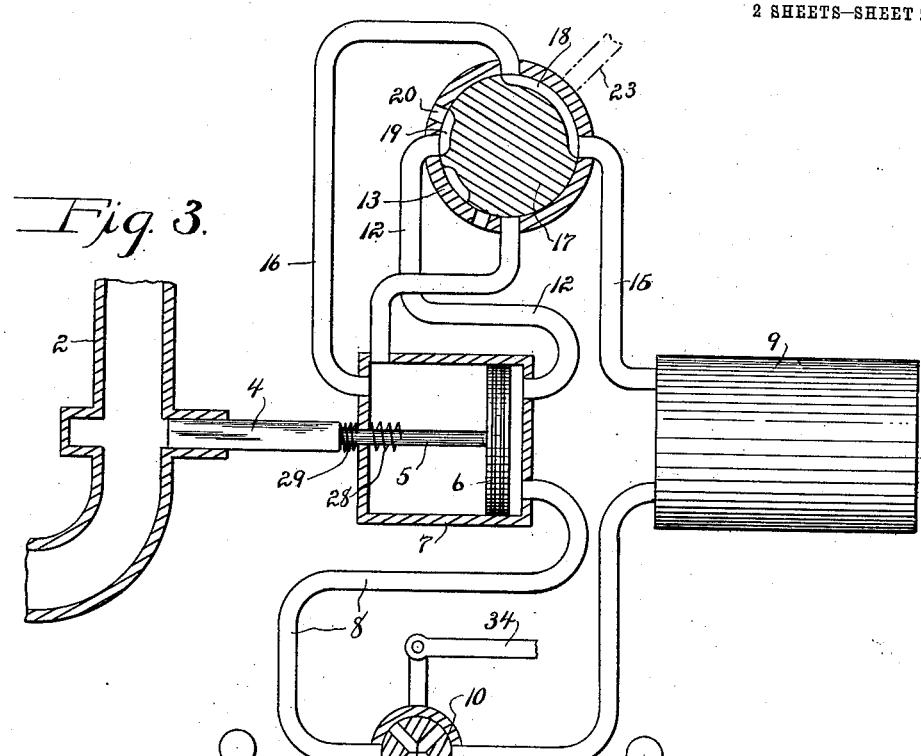
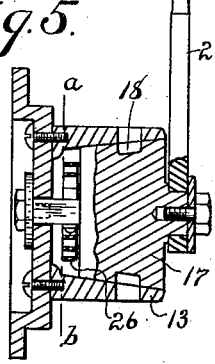
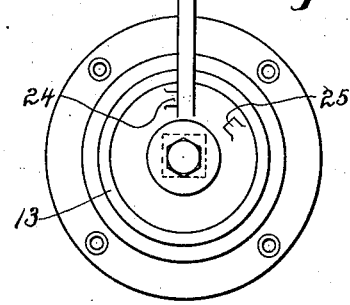
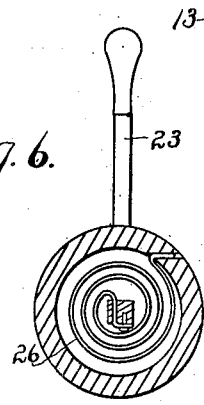
Witnesses
C. L. Weed
M. P. Nichols
Inventor
Chas. A. Willard
by Seymour & Earle
Attys
COLUMBIA PLANOGRAPH CO., WASHINGTON, D. C.

UNITED STATES PATENT OFFICE.

CHARLES A. WILLARD, OF MADISON, CONNECTICUT.

SUPPLEMENTAL CONTROL FOR MOTIVE POWER.

1,078,232.  Specification of Letters Patent.  Patented Nov. 11, 1913.

Application filed December 19, 1912. Serial No. 737,740.

*To all whom it may concern:*

Be it known that I, CHARLES A. WILLARD, a citizen of the United States, residing at Madison, in the county of New Haven and State of Connecticut, have invented a new and useful Improvement in Supplemental Control for Motive Power; and I do hereby declare the following, when taken in connection with the accompanying drawings and the characters of reference marked thereon, to be a full, clear, and exact description of the same, and which said drawings constitute part of this application, and represent, in—

Figure 1 a side view of an engine illustrating the application of my safety control operating device applied thereto. Fig. 2 a diagrammatic view shown in position after the safety control valve has been tripped and the power to the motor cut off. Fig. 3 a similar view showing the safety control valve in a closed position and the resetting valve in its open or resetting position. Fig. 4 an end view of the resetting valve. Fig. 5 a longitudinal vertical sectional view of the same. Fig. 6 a sectional view on the line *a—b* of Fig. 5.

This invention relates to an improvement in means for controlling motive engines, the object being to provide means for shutting off the power from an engine by external means outside of the control of the engine operator; and the invention consists in the construction hereinafter described and particularly recited in the claims.

Inserted into a pipe 2 leading from the boiler to the engine and in which pipe the engineer's throttle valve 3 is arranged, I provide a sliding supplemental throttle 4 which is connected by a stem 5 with a piston 6 mounted in a piston chamber 7. The forward end of the piston chamber is connected through a pipe 8 with the usual compressed air reservoir 9, and in the pipe 8 is a horizontally arranged valve 10 provided with an operating lever 11 which extends downward preferably between the tracks, and so as to be operated by any obstruction raised between the tracks, this valve being substantially the same as the valve shown in my application Serial No. 737,742 filed in even date herewith; and the obstruction may be like that shown in my application Serial No. 737,741 filed in even date herewith; or any other means for tripping the valve. The forward end of the piston chamber 7 is also connected by a forward relief pipe 12 with a resetting valve chamber 13 into which it opens. The compressed air-reservoir 9 is connected with the resetting valve chamber 13 by a pipe 15, and the resetting valve chamber 13 is connected with the rear end of the piston chamber 7 by a compressed air pipe 16. Within the resetting valve chamber 13 is a valve 17 provided with a port 18 adapted to connect the pipes 15 and 16; with a port 19 adapted to open the pipe 12 through a vent 20 in the casing; and with a port 21 to connect the back relief pipe 14 with a vent opening 22 in the valve chamber. Secured to the valve 17 is an operating lever 23 within easy reach of the operator, the movement of which is limited by stops 24, 25, and it is held against the stop 24 or in a closed position by a coil spring 26 one end of which is secured to the valve and the other to the valve casing.

Preferably and as shown in Fig. 1, the lever 11 of the valve 10 is attached to one end of a resetting rod 27 which is located so far away from the operator that it cannot be moved without stopping and getting down. In case a signal is set to stop and the obstruction raised in the path of the lever 11, and the operator attempts to pass this obstruction, the obstruction will turn the lever 11 and open the valve 10, allowing air from the compressed air reservoir 9 to pass through the pipe 8 into the forward end of the piston chamber 7 forcing the plunger rearward and moving the supplemental throttle 4 into the steam pipe 2 so as to cut off steam from the boiler to the engine. As the piston 6 moves rearward air in the piston chamber in rear of the piston will escape through the relief pipe 14 and through the port 21 to the relief outlet 22. The shock of rapid movement of the piston may be checked by a spring buffer 28. Power to the engine being shut off, it cannot be restored until the operator descends and moves the operating rod 27 to close the valve 10 and shut off the air from the compressed air reservoir to the forward end of the piston chamber. After the valve 10 has been closed, he then moves the resetting valve 17 which connects the compressed air reservoir 9 through the pipes 15 and 16 with the rear end of the piston chamber so that the compressed air will force the piston forward and move the supplemental throttle valve 4 out of the steam pipe 2. In this forward movement of the piston air in the piston chamber forward of the piston will escape through the pipe 12 and through the port 19 and vent 20. As soon as the supplemental throttle valve 4 is open the lever 23 is released, and under the action of the spring 26 it will return to its normal position, and the engineer can then control the engine through the usual throttle valve 3. The forward movement of the throttle valve may be checked by a buffer spring 29.

While I have shown a device for controlling the supplemental throttle valve 4 in connection with the steam pipe 2, it is apparent, without further illustration, that the throttle valve 4 might be replaced by a make-and-break switch in an electric system, the operation of controlling the valve being the same whether used with electricity or steam.

If desired, a sand pipe 30 leading from a sand box 31 may be provided with a sliding valve 32 connected by a rod 34 with the lever 11 of the valve 10, and so that when the valve is open, to shut off steam to the engine sand will be applied to the tracks.

While I have referred to the forward and rear ends of the piston chamber, this is for convenience in connection with the device as illustrated, but it is also obvious without illustration that the piston might be moved in the opposite direction, and connections between the piston chamber and the compressed air reservoir might be reversed.

I claim:—

1. The herein described supplemental control for motive power comprising a piston chamber, a piston therein, power control mechanism connected with said piston, a compressed air reservoir, valve controlled connections between the forward end of the piston chamber and reservoir, resetting connections between the reservoir and the rear end of said piston chamber, a resetting valve in said connection between the rear end of the piston chamber and the air reservoir, said valve having an externally arranged lever adapted to turn said valve, a channeled closure adapted to open and close the said connections, and vent pipes connected with the forward and rear ends of the piston chamber and adapted to be opened or closed by the said resetting valve.

2. In a motor, the combination with a steam pipe from the boiler to the engine, of a supplemental throttle valve in said pipe, a piston chamber, a piston therein, connection between said piston and supplemental throttle valve, a compressed air reservoir, valve controlled connection between the forward end of the piston chamber and the air reservoir, connections between the reservoir and the rear end of said piston chamber, a resetting valve in said connections and adapted to open or close said connections, vent pipes opening from the forward and rear ends of said piston chamber and adapted to be opened or closed by said resetting valve.

In testimony whereof, I have signed this specification in the presence of two subscribing witnesses.

CHARLES A. WILLARD.

Witnesses:
 FREDERIC C. EARLE,
 CLARA L. WEED.

---

Copies of this patent may be obtained for five cents each, by addressing the "Commissioner of Patents, Washington, D. C."